United States Patent
Thakkar

(10) Patent No.: US 10,049,123 B2
(45) Date of Patent: Aug. 14, 2018

(54) SYSTEM AND METHOD FOR STORING HIERARCHICAL DATA RELATED TO AN IMAGE

(71) Applicant: PIXIA CORP., Reston, VA (US)

(72) Inventor: Rahul C. Thakkar, Leesburg, VA (US)

(73) Assignee: PIXIA CORPORATION, Herndon, VA (US)

( * ) Notice: Subject to any disclaimer, the term of this patent is extended or adjusted under 35 U.S.C. 154(b) by 0 days.

(21) Appl. No.: 15/595,483

(22) Filed: May 15, 2017

(65) Prior Publication Data

US 2017/0249305 A1 Aug. 31, 2017

Related U.S. Application Data

(63) Continuation of application No. 15/287,168, filed on Oct. 6, 2016, now Pat. No. 9,684,848, which is a (Continued)

(51) Int. Cl.
*G06K 9/46* (2006.01)
*G06F 17/30* (2006.01)
(Continued)

(52) U.S. Cl.
CPC ...... *G06F 17/3025* (2013.01); *G06F 17/3028* (2013.01); *G06F 17/30327* (2013.01);
(Continued)

(58) Field of Classification Search
None
See application file for complete search history.

(56) References Cited

U.S. PATENT DOCUMENTS

| | | | |
|---|---|---|---|
| 5,455,680 A | * | 10/1995 | Shin ......................... G06T 9/40 375/E7.088 |
| 5,892,849 A | * | 4/1999 | Chun ................... H04N 19/503 375/E7.081 |

(Continued)

OTHER PUBLICATIONS

Operations on images using Quad trees, Gregory M. Hunter at al, IEEE, vol. PAMI-1, No. 2, Apr. 1979, pp. 145-153.*

(Continued)

*Primary Examiner* — Jayesh A Patel
(74) *Attorney, Agent, or Firm* — Pillsbury Winthrop Shaw Pittman, LLP

(57) ABSTRACT

A system and method of storing data related to an image is disclosed. The method may include: storing computed statistical data for pixels of an image; unevenly dividing the image into polygonal image sections where each polygonal image section includes substantially homogenous features; dividing the image into quads such that each quad has boundaries that contain at least a portion of one of the polygonal image sections; storing the original image; storing at least one reduced resolution dataset (RRD or R-set) of the image; and storing data related to a form of a hierarchical tree-based structure that represents the image or the at least one R-set. Each hierarchical tree structure may have a root node that corresponds to the image, branches that correspond to the plurality of quads, and leaf nodes that correspond to polygonal image sections.

21 Claims, 7 Drawing Sheets

Related U.S. Application Data continuation of application No. 13/779,251, filed on Feb. 27, 2013, now Pat. No. 9,489,729, which is a continuation of application No. 12/784,663, filed on May 21, 2010, now Pat. No. 8,411,970.

(60) Provisional application No. 61/314,257, filed on Mar. 16, 2010.

(51) Int. Cl.
*G06T 7/00* (2017.01)
*G06T 7/90* (2017.01)

(52) U.S. Cl.
CPC ...... *G06F 17/30589* (2013.01); *G06T 7/0002* (2013.01); *G06T 7/90* (2017.01)

(56) References Cited

U.S. PATENT DOCUMENTS

| | | | | |
|---|---|---|---|---|
| 6,356,665 | B1 * | 3/2002 | Lei | G06T 9/40 341/79 |
| 6,507,676 | B1 * | 1/2003 | Harrington | G06T 7/44 345/582 |
| 6,633,683 | B1 * | 10/2003 | Dinh | G06K 9/40 345/611 |
| 6,910,001 | B2 * | 6/2005 | Hammersley | G06T 17/005 345/420 |
| 8,259,106 | B2 * | 9/2012 | Dammertz | G06T 11/001 345/420 |
| 2003/0012438 | A1 * | 1/2003 | Krtolica | G06K 9/00463 382/173 |
| 2003/0152250 | A1 * | 8/2003 | Pewzner | G06K 9/00268 382/115 |
| 2006/0197777 | A1 * | 9/2006 | Cha | H04N 19/34 345/600 |
| 2007/0297669 | A1 * | 12/2007 | Neal | G06K 9/00456 382/168 |
| 2008/0162038 | A1 * | 7/2008 | Comer | G01C 21/30 345/620 |
| 2009/0067506 | A1 * | 3/2009 | Doser | H04N 19/176 375/240.18 |

OTHER PUBLICATIONS

Operations on images using Quad trees, Gregory M. Hunter at al, IEEE, vol. PAM 1-1, No. 2, Apr. 1979, pp. 145-153.*
Storage and Management of similar images, J. Braz. et al., SCIELO, 2000, pp. 13-25.*

* cited by examiner

SYSTEM AND METHOD FOR STORING HIERARCHICAL DATA RELATED TO AN IMAGE

CROSS REFERENCE TO RELATED APPLICATIONS

The present patent application is a continuation application of U.S. patent application Ser. No. 15/287,168 filed on Oct. 6, 2016, which is a continuation application of U.S. Pat. No. 9,489,729 that issued on Nov. 8, 2016, which is a continuation of U.S. Pat. No. 8,411,970 that issued on Apr. 2, 2013, which claims priority from provisional patent application No. 61/314,257 that was filed on Mar. 16, 2010, the entire content of each are incorporated herein by reference.

BACKGROUND OF THE INVENTION

Field of the Invention

The present invention pertains to data management and in particular to a method and system for storing data related to an image. More particularly, the stored data relates to the image, a plurality of quads, and a plurality of polygonal image sections that are organized in a form of a hierarchical tree structure.

Discussion of Related Art

An image generally contains a plurality of pixels and each pixel has one, two or more bands. Each band has a certain color depth or bit depth. For example, an RGB color-based image has 3 bands, the red band (R), the green band (G) and the blue band (B). Each of the R, G and B bands can have a depth of 8 bits or more. In order to be able to visualize or view images having a bit-depth greater than 8 bits per band (i.e., images having a depth of N-bits per band, with N greater than 8) on a display device that is configured to display an image having 3 bands (each band having an 8-bit depth), a bit depth down-sampling operation is performed. For example, a bit-depth down-sampling operation is performed on the image having N-bits per band to transform or convert the image into another image in the RGB system where each band (R band, G band and B band) has 8 bits of depth (i.e., a 24-bit RGB image).

Some conventional methods use a pre-computed N-bit to 8-bit look up table (LUT) per band to down-convert the image with higher bit depth per band into a lower bit depth (e.g., 8-bit depth) per band. When referring to "higher" bit depth per band herein, this is intended to refer to a bit depth of greater than 8 bits per band. Other methods such as tone mapping method involve executing algorithms to adaptively compute the N-bit (where N is greater than 8) to 8-bit conversion, pixel by pixel. The latter method of performing the down-conversion or down-sampling can be computer and time intensive based on the quality of the implementation of the algorithm. An increasing number of computing environments have implemented these two types of down-conversion methods into hardware or into software. Most of these methods employ the generation and application of statistical information gathered by processing pixel data in the image.

When pixels containing bands with bit depth greater than 8-bits per band are stored into disk files, they are stored in 16-bit, 32-bit, or higher bit depths per band. For example, an original image sensor may have captured data at 10, 11, 12, or 15 bits per band. However, when an image file containing these pixel values is stored on disk, it is generally stored at 16-bits per band. While this may be considered as waste of space, it is also deemed highly efficient for computing platforms of today.

When a vendor distributes to a customer imagery that was originally captured at a value greater than 8 bits per band (e.g., 16-bits per band), very often the vendor is forced to distribute the original image data as well as additional image data that was pre-converted at significant computational cost to the 8-bit depth per band, specifically for display. Under these circumstances, the 8-bit data would occupy an additional 50% more storage alongside the original 16-bit data. Compression is further used to save space on disk. If the compression is lossy, the compression degrades the image. If the compression is not lossy, the compression is not as efficient to read and decode the compressed data for visualization. A customer sometimes may choose to discard the original 16-bit data and just use the 8-bit data in critical decision making tasks because of a lack of sufficient amount of storage or the lack of computing power to handle on-the-fly conversions. If the customer chooses to only use 16-bit data in critical decision making tasks, the overhead of on-the-fly conversion to 8-bit depth for visualization bears an additional computational cost or requires additional computing power which further increases costs. However, the flexibility that on-the-fly 16-bit to 8-bit depth conversion offers is that the customer can select one of several methods to convert the image to 8-bit depth prior to display.

If a computationally inexpensive method was available for better on-the-fly visualization of data that was collected and stored at bit depths greater than 8-bits per band, it would be ideal to supply the original data (greater than 8-bits per band) to the customer and let the customer choose amongst the various methods available for displaying this data. Hence, distributing pre-converted 8-bit depth per band data would not be necessary, thus saving additional disk space requirement as well as saving the vendor the added cost of converting the data to 8-bit depth.

The method or methods described in the following paragraphs provide a mechanism for pre-computing and storing data within the image, and utilizing this data to make subsequent on-the-fly conversion of the image data having a higher bit depth per band to a lower bit depth per band (e.g., 8 bit depth per band) for the display of the image computationally inexpensively.

BRIEF SUMMARY OF THE INVENTION

The teachings of the present disclosure provide a method for storing data related to an image, which may include statistical data for pixels of an image, the pixels having a higher bit depth per band than that which can be displayed on a standard display screen. The higher bit depth per band may include depths that are greater, e.g., than 8 bits per band. The method may include: unevenly dividing the image having pixels with the higher bit depth per band into a plurality of polygonal image sections, each polygonal image section including substantially homogenous features; computing statistical data for pixels within each polygonal image section; and storing the statistical data. The method may further include dividing the image into a plurality of quads such that each quad has boundaries that contain at least a portion of one of the plurality of polygonal image sections. Still further, the method may include storing the original image, at least one reduced resolution dataset (RRD or R-set) of the image, and/or data related to a form of a hierarchical tree-based structure that represents the image and/or the at least one R-set.

According to the teachings of the present disclosure, a system is provided for storing data related to an image, which may include statistical data for pixels of an image, the pixels having a higher bit depth per band than that which can be displayed on a standard display screen. The system may include at least one processor configured to: unevenly divide the image having pixels with the higher bit depth per band into a plurality of polygonal image sections, each polygonal image section including substantially homogenous features; compute statistical data for pixels within each polygonal image section; and store the statistical data. The at least one processor may be further configured to divide the image into a plurality of quads such that each quad has boundaries that contain at least a portion of one of the plurality of polygonal image sections. Still further, the least one processor may be configured to store the original image, at least one RRD or R-set of the image, and/or data related to a form of a hierarchical tree-based structure that represents the image and/or the at least one R-set.

According to the teachings of the present disclosure, a method is provided for organizing the image, the plurality of quads, and the plurality of polygonal image sections in the form of the hierarchical tree structure such that a root node may correspond to the image, a plurality of branches may correspond to the plurality of quads (each of which may have two or more leaf nodes), and a plurality of leaf nodes may correspond to a polygonal image section of the plurality of polygonal image sections.

According to the teachings of the present disclosure, a system is provided that organizes the image, the plurality of quads, and the plurality of polygonal image sections in the form of the hierarchical tree structure such that a root node may correspond to the image, a plurality of branches may correspond to the plurality of quads (each of which may have two or more leaf nodes), and a plurality of leaf nodes may correspond to a polygonal image section of the plurality of polygonal image sections.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS OF THE INVENTION

Figure 1:
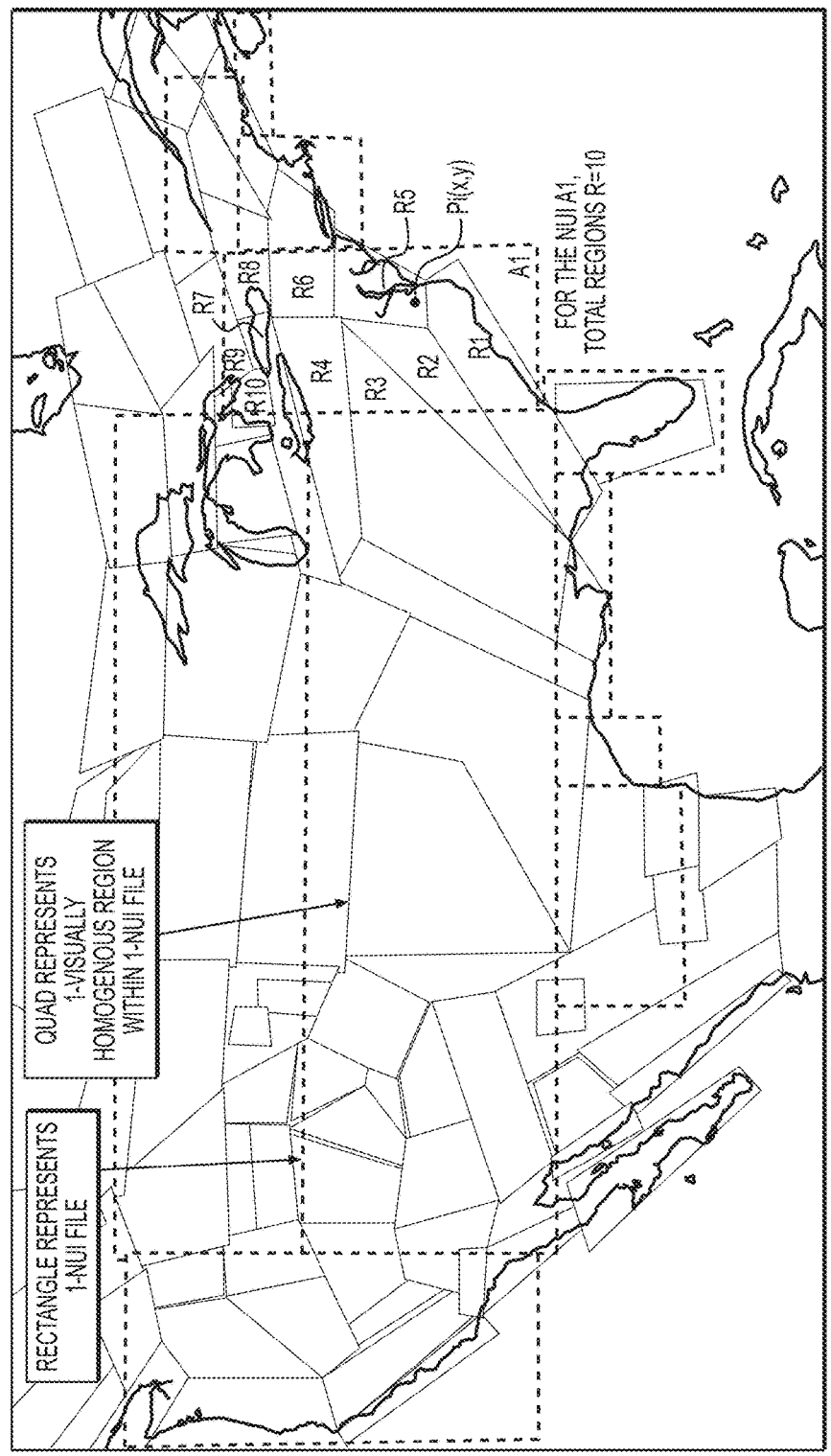
FIG. 1 depicts the geographical map of the continental United States of America (CONUS) that is divided into visually homogenous regions or sections, according to an embodiment of the present invention.

Some image files such as image files in the new universal image (NUI) file format implemented by PIXIA Corporation, can contain a relatively large number of pixels that can scale to over four billion ($4\times10^9$) by four billion ($4\times10^9$) pixel raster. NUI image files having a size of several million pixels wide by several million pixels tall can be found in many areas including geography, aerial and satellite images, medicine, etc. For example, images that cover many geographical areas such as cities, provinces, countries and continents can be as large as several million pixels by several million pixels. The NUI file format has the capacity of storing typical band layouts such as luminance, red-green-blue (RGB), near infrared (NIR), multi-spectral, hyper-spectral and ultra-spectral bands. The NUI file format can also be configured to store various bit-depths such as, but not limited to, unsigned 8 bits (u8), signed 16 bits (s16), unsigned 16 bits (u16), signed 32 bits (s32), unsigned 32 bits (u32), 32-bit floating point (f32), 64-bit double precision floating point (f64) and complex. In addition, within NUI files containing bands with signed 16-bit depth and unsigned 16-bit depth, the NUI file format can also carry between 9 and 15-bits per band image data. The NUI file format can store the image data uncompressed. Alternatively, the NUI file format can also store the image data as compressed. In one embodiment, the compression can be performed using a conventional JPEG2000 compression method.

The NUI file, as part of its format, stores statistical data about the image. This statistical data includes, but is not limited to, a histogram of each band of each pixel in the image, minimum, maximum value of each band of each pixel in the image, standard deviation, mean, median, mode, skew, and kurtosis of each band of each pixel in the image. In one embodiment, a display system or device can use the statistical data to generate a custom look-up table (LUT). Multiple LUTs may be generated using multiple techniques based on user's requirements. The LUT may be further used to convert pixels in the image containing bands of higher bit depth (e.g., bit depth greater than 8-bits per band) to an image containing bands of lower bit-depth (e.g., 8-bits per band) that can be displayed on, for example, a 24-bit RGB display device (i.e., a display device limited to an 8-bit depth per band).

Figure 4:
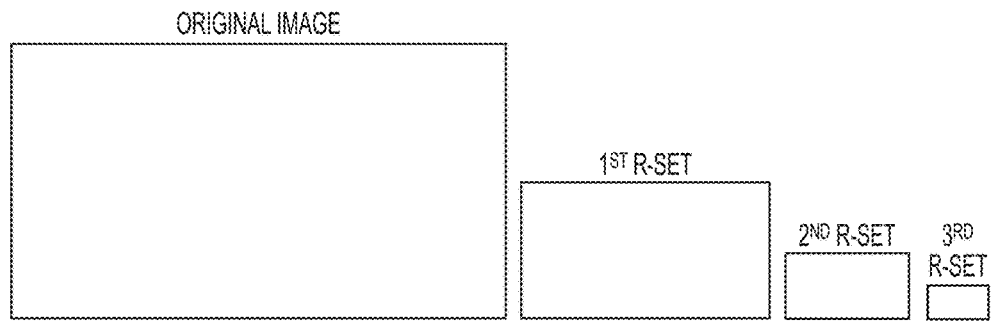
FIG. 4 is a representation of R-sets in relation to each other and in relation to the original image, according to an embodiment of the present invention.

The NUI file, as part of its format, stores in addition to the original image, a set of user-defined reduced resolution datasets (RRDs or R-sets). Each RRD is a smaller, zoomed-out version of a previous RRD and a first RRD is a smaller, zoomed-out version of the original image. The terms RRD and R-set are used herein interchangeably. FIG. 4 is a representation of R-sets in relation to each other and in relation to the original image, according to an embodiment of the present invention. As shown in FIG. 4, the first R-set is a zoomed-out version of the original image, the second R-set is a zoomed-out version of the first R-set, and the third R-set is a zoomed-out version of the second R-set, etc.

However, the use of the histogram for the entire NUI file, in particular when the NUI file is relatively large (e.g., a file containing imagery captured over a vast geographical region such as satellite or aerial imagery), may have a drawback. Indeed, as the number of populated pixels in the NUI file increases, the dynamic range of pixel band color values stored within the image data can increase considerably. For example, a large geographical area occupied by a country such as the United States of America, China, Russian Federation or India may cover various geographical features such as deserts, tropical forests, farmlands, snow capped or rocky mountain ranges, and densely populated cities. Therefore, a histogram obtained from such a diverse set and vast region of pixels would have a very broad distribution of color (e.g., golden, brownish, green, blue, etc.).

If such a diverse dynamic range of pixels is converted from higher bit-depths, for example from unsigned 16 bits (u16 bits) per band to unsigned 8 bits per band within a 3 band color scheme, a single u16 to u8 look-up table (LUT) may not have enough slots to represent all the visual features and the range of colors within these features.

The resulting converted image (converted from higher bit depths per band to lower bit depths per band) may look "washed out" or "faded" with every region losing detail so as to do distribute the limited color space to all other regions. This is generally rectified by applying further image processing methods such as a contrast curve or dithering to the converted image. Since the detail is already lost, the best this process can do is add additional artifacts that further remove detail but give the perception of greater image fidelity. For example, subtle gradations in clouds and snow covered regions of very rocky mountains may not show up and would look to the eye all white. This may not be desirable when implementing high dynamic range rendering (HDRR) and tone mapping to retain a high dynamic range image (HDRI). Hence, in order to remedy this deficiency, in one embodiment, a plurality of histograms can be generated and stored for geographical regions that contain reasonably homogeneous features.

In one embodiment, a geographically diverse region image such as a geographical image of United States of America can be divided into, for example, a plurality of polygonal image sections or regions (e.g., triangular sections, quadrilateral sections, pentagonal sections, hexagonal sections, etc., or any combination of two or more thereof) that have reasonably visually similar geographical features. Consider a geographically contiguous region. Also consider that when looking at this region from an elevated point (for example, of over 10,000 meters), the color-space of the region seems to be subjectively visually uniform (for example: a desert, a mountain range, or a tropical rain forest). In one embodiment, such a region can be considered as having reasonably similar features in the present context. Such a region can also be referred to as a relatively homogenous region in the present context. Histograms and LUTs can be computed for each of the plurality of polygonal image sections. One of the LUTs computed for a specific image section can be selected and applied to pixels that fall into that image section and having a higher bit-depth per band to transform each respective image section into a corresponding image section having a lower bit-depth per band that can be displayed or viewed on a display device. In other words, a specific look up table within the computed plurality of LUTs that is associated with the polygonal section to which a pixel with the higher bit depth per band belongs to can be selected and used to transform the pixel having the higher bit depth per band into a pixel having a lower bit-depth per band that can be displayed or viewed on a display device. A LUT generated by using the overall image histogram can be applied to pixels that fall in sections outside of any of the polygonal image sections having the features. However, the LUT generated by using the overall image histogram may not be needed if each pixel in the image falls within at least one specific polygonal section containing a feature. In other words, the LUT generated by using the overall image histogram may not be needed if substantially the entire image is divided into polygonal sections for which a specific LUT can be calculated.

For instance, for a given NUI image or R-set, the NUI can be divided into R distinct relatively homogenous regions. For each specific relatively homogenous region $R_s$ (i.e., for each region having relatively homogeneous features), an entry $E_s$ can be computed. The entry $E_s$ is an abstract object that contains all statistical and polygonal data to associate $E_s$ with a corresponding region $R_s$.

In one embodiment, the polygonal sections can be quadrilateral sections. In one embodiment, an entry $E_s$ of each quadrilateral section in the plurality of quadrilateral sections contains: (a) a single quadrilateral (quad) $Q_s$. The quad $Q_s$ is defined, for example, as a closely convex quadrilateral in pixel space to cover a region $R_s$ that is reasonably homogenous with respect to its visual features $F_s$. In one embodiment, the selection of the quadrilateral sections or regions having the homogenous features in the image can be accomplished manually by selecting manually each quadrilateral region or section in the image based on the perception of a user. In another embodiment, the selection of the quadrilateral sections can be accomplished automatically using methods or algorithms (implemented by hardware or software) that can detect various homogenous features and thus delimit the various homogenous features by quadrilaterals to define the quadrilateral sections.

In one embodiment, the entry $E_s$ further contains (b) statistical data, for example in the form of a histogram $H_s$ for all pixels within the quadrilateral $Q_s$. The histogram $H_s$ is computed and stored for each band in each pixel within the homogenous quad $Q_s$ section. In one embodiment, pixels on the boundaries of each quadrilateral section $Q_s$ can be included within the quadrilateral sections so as to eliminate, for example, sub-pixel errors or lost pixel issues. The relative homogeneity of each quadrilateral region or section is substantially not affected by the addition of the boundary pixels. The time $t_s$ at which $H_s$ was generated is also stored.

In one embodiment, the statistical data may further include, optionally, (c) a plurality of N computed LUTs, i.e., N LUTs $L[N]_s$, where N is selected between zero and $N_{max}$ (i.e., $0<N<N_{max}$). $N_{max}$ may be user-defined. The plurality N LUTs are generated and saved by applying methods that employ the histogram (e.g., histogram equalization, standard deviation, min-max stretching, linear contrast curves, gamma-based contrast curves, S-shaped contrast curves, Gaussian curves, etc.). The time $t[N]_s$ at which each of LUTs $L[N]_s$ were generated may be saved.

In one embodiment, the statistical data may also include, optionally, (d) a plurality of M custom LUTs $L[M]_s$ where M is selected between zero and $M_{max}$ (i.e., $0<M<M_{max}$). $M_{max}$ may be user defined. The time $t[M]_s$ at which the LUTs were generated may be saved. A custom LUT is a LUT generated manually or derived empirically with manual intervention and control.

Hence, in one embodiment, an entry $E_s$ is associated with each quad $Q_s$ that covers a region $R_s$ having homogenous features $F_s$. Therefore, there are several entries $E_s$ per NUI image as well as for each of its R-sets. A histogram $H_s$ is computed for all pixels within a quad $Q_s$ and stored at time $t_s$. Optionally, a plurality of N-computed LUTs $L[N]_s$ and a plurality of M-custom LUTs $L[M]_s$ may be computed and stored at, respectively, time $t[N]_s$ and time $t[M]_s$. Therefore, $E_s$ is an object whose members are $Q_s$, $H_s$, $t_s$, and optionally $L[N]_s$ and $t[N]_s$, $L[M]_s$ and $t[M]_s$. Given a subjectively homogenous visual feature $F_s$ that covers a geographic region $R_s$, the corresponding entry $E_s$ contains data that is sufficient to quantitatively define the geographic bounds of region $R_s$ and convert all pixels that are within region $R_s$ from a known bit-depth higher than 8-bits per band to 8-bits per band for visualizing these pixels on a 24-bit RGB display device. In one embodiment, $E_s$ may be represented as $E_s(Q_s, H_s, t_s, L[N]_s$ at $t[N]_s, L[M]_s$ at $t[M]_s)$.

Figure 5:
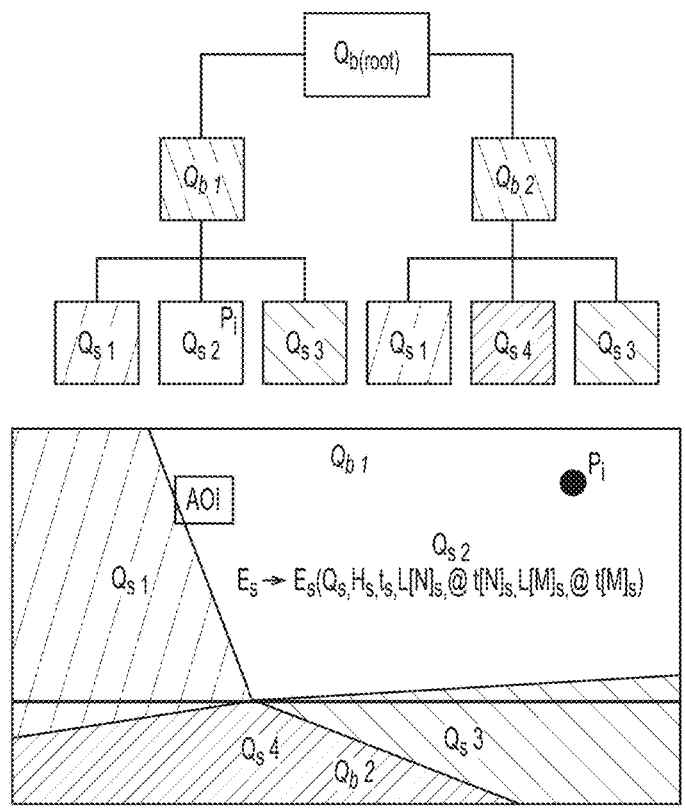
FIG. 5 represents a hierarchical tree or relationship structure between various quads within an image, according to an embodiment of the present invention.

In one embodiment, if the number of regions for a given image is relatively large, optionally, a bounding quad $Q_b$ is generated for a group of T quads $Q_s[T]$ (where $T \geq 0$) based on geographical proximity. In one embodiment, under a single bounding $Q_b$, multiple quads $Q_s$ may overlap. In addition, in one embodiment, multiple bounding quads $Q_b$ may also overlap. FIG. 5 represents a hierarchical tree or relationship structure between the various quads, according to en embodiment of the present invention. The root of the tree or structure represents the entire image. As shown in FIG. 5, an image is divided into four regions $R_1$, $R_2$, $R_3$ and $R_4$, each defined by quads $Q_{s1}$, $Q_{s2}$, $Q_{s3}$ and $Q_{s4}$. The quads being defined, the image is further divided into two further quads $Q_{b1}$ and $Q_{b2}$. As shown in FIG. 5, $Q_{b1}$ covers $Q_{s2}$ completely and $Q_{s1}$ and $Q_{s3}$ partially. Also as shown in FIG. 5, $Q_{b2}$ covers $Q_{s4}$ completely and $Q_{s1}$ and $Q_{s3}$ partially.

In one embodiment, a hierarchical tree of overlapping bounding quads $Q_b$ can be generated such that for a given bounding quad $Q_b$:

(a) the siblings of the bounding quad $Q_b$ are in the general proximity of the bounding quad $Q_b$;

(b) the bounding quad $Q_b$ wholly or partially envelopes the children $Q_s$ of the bounding quad $Q_b$; and (c) the parent of the bounding quad $Q_b$ wholly envelopes the bounding quad $Q_b$.

In one embodiment, the root $Q_{b(root)}$ of the hierarchical tree of overlapping plurality of bounding quads $Q_b$ is defined as the bounding box of the NUI file, and the leaf nodes at the bottom of the hierarchical tree of overlapping plurality of bounding quads $Q_b$ are all entries $E_s$, each entry $E_s$ being associated with a corresponding quad $Q_s$.

For example, a single root $Q_{b(root)}$ having a plurality of entries $E_s$ (associated with quads $Q_s$) as children can be used. When a search is performed to find a quad $Q_s$ containing a pixel $P_i$ (see, FIG. 5), any well known tree-based search algorithm may be used. Consider the tree structure depicted in FIG. 5. If a pixel is in the region defined by $Q_s2$, for example, the search would look for the pixel from the root node $Q_{b(root)}$. From the root node $Q_{b(root)}$, the search would move to node $Q_{b1}$ because the pixel is within the bounds of $Q_{b1}$. Within bounding quad $Q_{b1}$, the sections quads $Q_s1$, $Q_s2$ and $Q_s3$ are stored sorted in ascending or descending order of their geographical coordinates. By applying a known search algorithm through these regions, the pixel that is indeed within the quad $Q_s2$ can be found or located. Once this is known, the selected LUT from the corresponding entry $E_{s2}$ (associated with the quad $Q_s2$) is applied to convert $P_i$ to the corresponding pixel in the lower bit-depth output image.

Figure 6:
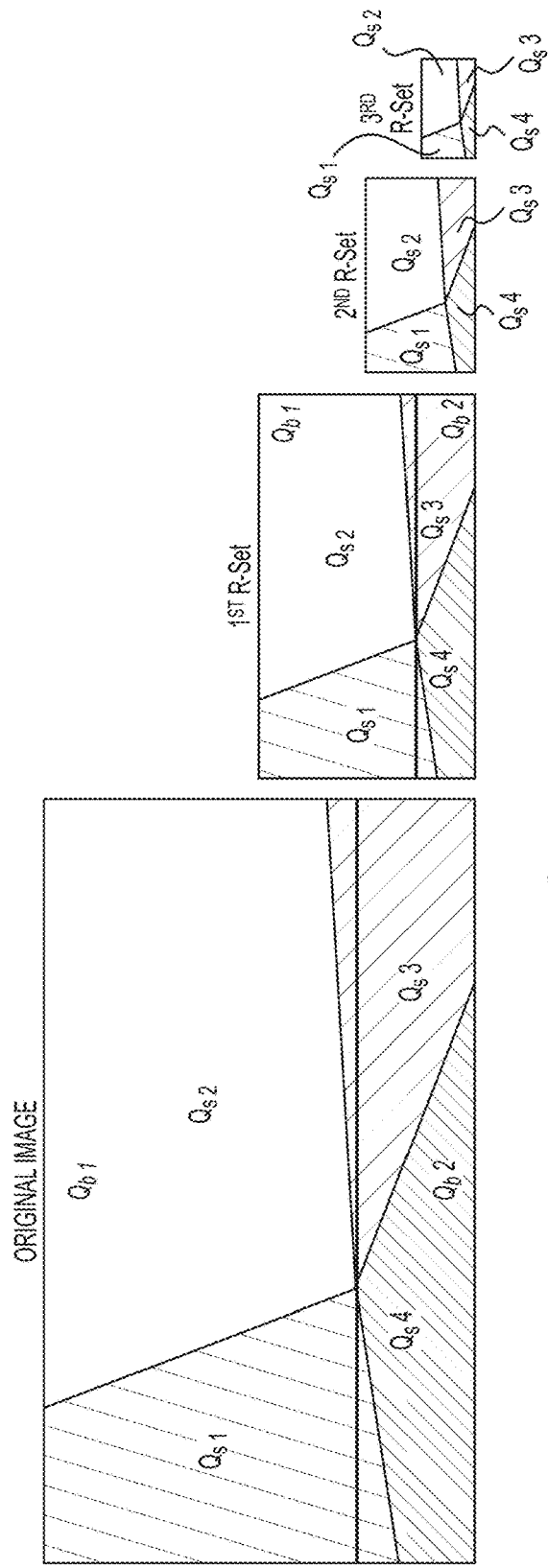
FIG. 6 depicts a structure for storing statistical data for the original image and each R-set, each divided into several regions, according to an embodiment of the present invention.

FIG. 6 depicts a structure for storing statistical data for the original image and each R-set, each divided into several regions, according to an embodiment of the present invention. This method of generating and storing feature-based statistics for a given image is applied to the original image and all its R-sets within the NUI file. The original image and each of its R-set is divided into several regions, each region $R_s$ for the image or R-set containing an entry $E_s$. The original image and each R-set also store the hierarchical tree to further assist in matching a pixel to a corresponding region quad $Q_s$ and hence to the entry $E_s$ containing $Q_s$.

Figure 7:
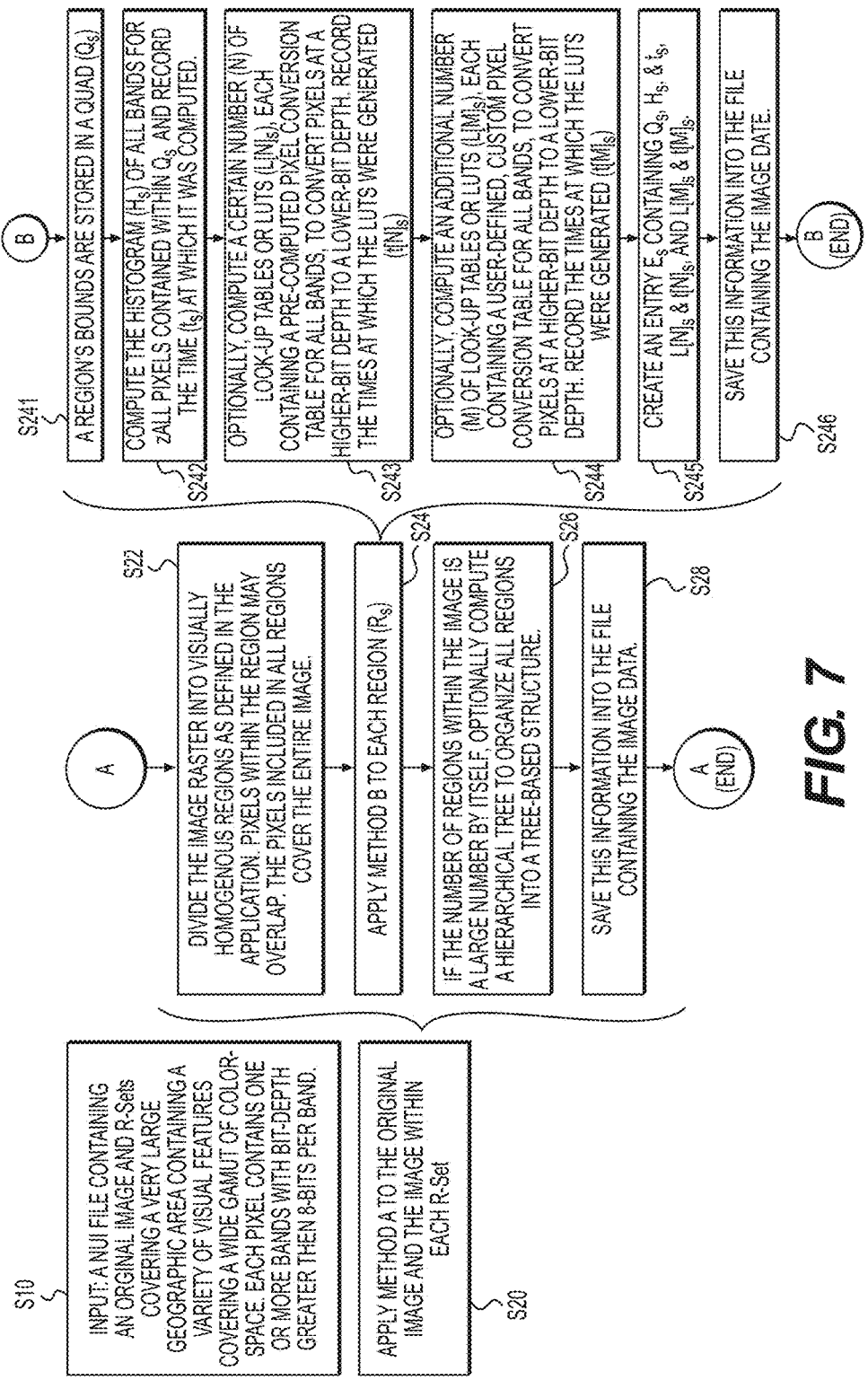
FIG. 7 is a flow chart depicting a method of pre-computing the statistical data used for converting a first image of higher bit depth to a second image of lower bit depth, according to an embodiment of the present invention.

FIG. 7 is a flow chart depicting a method of pre-computing the statistical data used for converting a first image of higher bit depth to a second image of lower bit depth, according to an embodiment of the present invention. A NUI file containing an original image and a plurality of R-sets covering a large geographical area containing a variety of visual features, the visual features covering a wide gamut of color-space, are input, at S10. A first method or procedure (method A) is applied to the inputted NUI file, at S20. The method A includes dividing the image (original image) into visually homogenous regions, as described in the above paragraphs, at S22. Pixels within the homogenous regions may overlap. Pixels included in all regions cover or form the entire image. The method A further includes applying a sub-procedure or method B to each region $R_s$, at S24. The sub-procedure (method B) will be described in detail in the following paragraphs. The method or procedure A further includes determining whether the number of regions within the image is a large number, and if the number of regions within the image is a large number, optionally computing a hierarchical tree to organize all regions into a tree-based structure, at S26. The method A further includes, storing the hierarchical tree-based structure into the file containing the image data, at S28.

The sub-procedure method B includes storing bounds of a region in a quad $Q_s$, at S241. The sub-procedure B further includes computing histogram $H_s$ of all bands for all pixels contained within the quad $Q_s$, and record a time $t_s$ at which it was computed, at S242. The sub-procedure method B further includes, optionally computing a number N of look-up tables or $LUT_S$ ($L[N]_s$), each LUT containing a pre-computed pixel conversion table for all bands, to convert pixels at a higher-bit depth to a lower-bit depth, and record times at which the LUTs were generated, at S243. The sub-procedure method B may further include, optionally compute an additional number M of look-up tables or LUTs (L[M]$_s$), each containing a user-defined, custom pixel conversion table for all bands, to convert pixels at a higher-bit depth to a lower-bit depth, and record times at which the LUT$_s$ were generated, at S244. The sub-procedure method B proceeds by creating an entry E$_s$ containing Q$_s$, H$_s$, and t$_s$, L[N]$_s$ and t[N]$_s$ and L[M]$_s$ and t[M]$_s$ at S245. The sub-procedure method B further stores the created entry Es into the file containing the image data.

Figure 8:
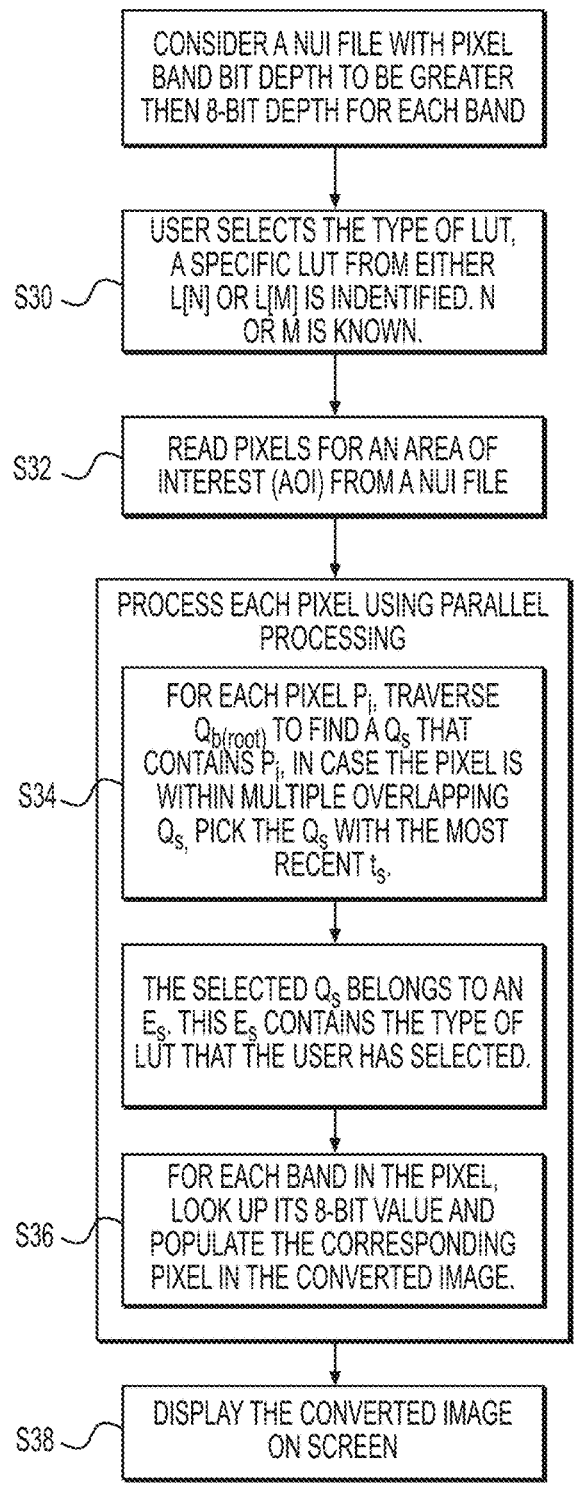
FIG. 8 is a flow chart depicting the method of converting a first image to a second image that can be displayed for a given area of interest (AOI) in the NUI file, using feature-based statistics and associated data generated earlier, according to an embodiment of the present invention.

FIG. 8 is a flow chart depicting the method of converting a first image to a second image that can be displayed for a given area of interest (AOI) or viewport in the NUI file, using feature-based statistics and associated data generated earlier, according to an embodiment of the present invention. The method includes, for a NUI file having a pixel depth per band greater than 8-bit per band, selecting a specific LUT from either L[N] or L[M] where N or M is known, at S30. The method further includes, reading pixels from an area of interest (AOI) or viewport from a NUI file, at S32. The areas of interest AOI or viewport can be for example a rectangular area within the bound quad $Q_{b1}$, as shown in FIG. 5.

A viewport can be defined as a "window" within an image having a pixel width W and a pixel height H. The image can have a large pixel width (e.g., 1,000,000 pixels) and a large pixel height (e.g., 2,000,000 pixels). Such an image cannot be displayed on current display devices (e.g., a screen) in its entirety. In addition, such an image cannot be loaded in computer main memory in its entirety for any form of processing, given current available computer main memory capacity. Hence, an application is forced to load a smaller sub-section, window, area-of-interest or viewport of the very large image. This smaller sub-section, window or viewport has a pixel width VW and pixel height VH which typically range from several tens of pixels to several thousands of pixels (where W>VW and H>VH). For instance, within a 1,000,000 pixel wide and 2,000,000 pixel tall image, a sub-section or viewport starting from pixel coordinate (300000, 450000) within the image and having a pixel width of 1920 pixels and a pixel height of 1080 pixels can be selected. The viewport is wholly contained within the image. Therefore, if (0, 0) is the address of the top left pixel of the W×H image, and if (X, Y) is the address of the top left corner pixel of the VW×VH viewport within the image, then 0≤X<(X+VW)≤W and 0≤Y<(Y+VH)≤H.

The method further includes for each pixel P$_i$, traversing $Q_{b(root)}$ to find a Q$_s$ that contains P$_i$, at S34. If the pixel P$_i$ is within multiple overlapping Q$_s$, the Q$_s$ having the most recent time t$_s$ can be selected. The selected Q$_s$ is associated to an entry E$_s$. The entry E$_s$ contains the type of LUT that the user selected. The method further includes, for each band in the pixel, determining its 8-bit value and populating the corresponding pixel in the converted image (i.e., converted AOI or viewport), at S36. In one embodiment, the selection of the Q$_s$ for each pixel and the determination for each band of the pixel its 8-bit value is performed using parallel processing. However, as it can be appreciated, in another embodiment, this can also be performed using sequential processing. After each pixel is processed as described above, the converted image can then be displayed on a display device (e.g. a display screen), at S38.

The data that is generated using the above outlined procedure can be stored within a NUI file as a NUI Property. In one embodiment, the data can be formatted in Extensible Markup Language (XML) for readability. Alternatively, the data can be stored as a data structure in binary format.

For example, in the case of the continental United States of America (CONUS), if one were to generate multiple NUI image files to cover the entire continental United States, at a resolution of 1 meter per pixel, each NUI can range from few hundred gigabytes (GB) to several terabytes (TB). FIG. 1 depicts the geographical map of the continental United States of America (CONUS). An example of areas covered by the multiple NUI image files are shown as dotted rectangles on the geographical map. On the other hand, if the continental United States is divided into visually homogenous regions or sections (i.e., divided on regions having substantially homogenous features), quadrilateral shaped regions (quad regions) can be defined and shown on the geographical map of the continental United States of America. As shown in FIG. 1, the quadrilaterals can have various shapes including trapezoid shape, rectangular shape, or any other polygonal shape (e.g., pentagonal shape, hexagonal shape, or other more complex shape, etc.). As a result, each of the rectangles defining the NUI images can be divided into several quad regions. For example, as shown in FIG. 1, the NUI image of the area A$_1$ is divided into about 10 homogenous regions or sections $R_1, R_2, \ldots, R_{10}$.

For each specific homogenous region $R_1, R_2, \ldots, R_{10}$, a corresponding entry $E_1, E_2, \ldots, E_{10}$ is available and stored in the NUI file. Any given pixel P$_i$(x, y) in a NUI file may fall within multiple regions and thus may be associated with a plurality of entries E$_s$. For example, as shown in FIG. 1, a pixel may fall within homogenous section R$_1$ and within homogenous section R$_3$. In other words, the homogenous sections R$_1$ and R$_3$ overlap. As a result, the pixel that falls within both R$_1$ and R$_3$ may be associated with both entry E$_1$ and entry E$_3$. In this case, a simple rule may be applied to identify which entry to select (E$_1$ or E$_3$). For example, the entry E$_3$ can be selected if time t$_3$ is greater than time t$_1$.

A plurality of LUTs (N LUTs) can be generated by applying methods that employ a histogram H$_s$ for all pixels within a given quad. The LUTs are generated using various methods including, histogram equalization, standard deviation, min-max stretching, linear contrast curves, gamma-based contrast curves, S-shaped contrast curves, Gaussian, etc. The N LUTs are then saved in the NUI file. For example, a plurality of LUTs can be generated for region R$_1$ by employing histogram H$_1$ within entry E$_1$. The plurality of LUTs generated for region R$_1$ are saved the NUI file that contains the region R$_1$.

A LUT determines the "look" of the image, after it is converted. The user may manually select what kind of LUT best describes the way in which the user wants to display the image prior to performing the conversion.

In the case where some pixels within a NUI file are replaced by other pixels, E$_s$ entries for the regions containing the updated pixels also need to be updated accordingly. In another embodiment, the histogram update can be accomplished by re-computing the histograms H$_s$ and the LUTs in the entry E$_s$ for the updated pixels.

As stated in the above paragraphs, in one embodiment, the homogenous regions containing substantially homogenous features can be generated or determined manually based on the perception of a user or determined automatically using feature-detection methods or algorithms. In one embodiment, a database of regions that have substantially homogenous geographic features can be generated manually for the whole globe. The database can then be maintained or updated infrequently to take into account, for example, seasonal changes (spring, summer, fall and winter). Indeed, regions that were, for instance, greener during summer can be covered with snow during winter. As a result, regions that were part of one or more "greener quads" may be annexed to one or more "whiter quads." In one embodiment, thermal and topological contour maps can be used to extend automation of the process of generating quads with homogenous geographic features. Desired regions having substantially homogenous features can be selected from the database and can be used to generate a list of histogram entries for a given NUI file.

Figure 2A:
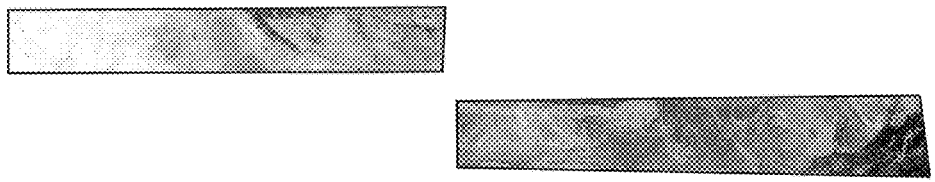
FIG. 2A depicts a converted image from an unsigned 16 bits per band image using a conventional standard-deviation technique applied to the histogram of the whole image file.

FIG. 2A depicts a converted image from an unsigned 16 bits per band. The converted image contains a significant dynamic range of data, as shown on the top left area and on the bottom right area of the image. The image is converted using a conventional standard-deviation applied to the histogram of the entire image file. A LUT is derived and applied to convert the unsigned 16 bits per band image from the higher bit-depth per band (16 bits per band) to a lower bit-depth per band (8 bits per band) to display or view the converted image on a display device, the display device being configured to display an image having a pixel depth of 8 bits per band. This image shows what the output 8-bit depth image would look like without applying the method of converting an image having a higher-bit depth per band into an image having a lower bit depth per band described herein.

Figure 2B:
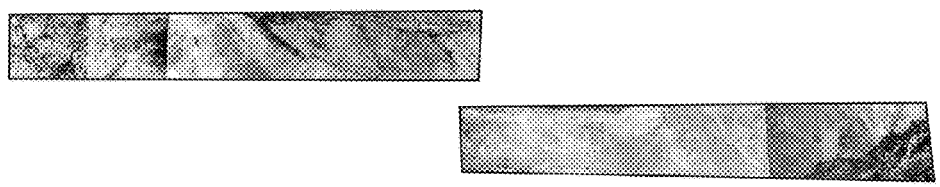
FIG. 2B depicts the same image converted from unsigned 16 bits per band to an unsigned 8 bits per band image according to an embodiment of the present invention.

FIG. 2B depicts the same image converted from unsigned 16 bits per band to an unsigned 8 bits per band image according to an embodiment of the present invention. The regions have been shown in FIG. 2C. A histogram was computed for each of the regions. For each region, using the histogram, the corresponding unsigned 16 bit to unsigned 8 bit look-up table was generated using a conventional standard deviation method. The look-up table was then applied to the image within the corresponding region to convert from the original unsigned 16-bit image to a displayable unsigned 8-bit image.

The image shown in FIG. 2B looks "patchy" relative to the image shown in FIG. 2A which is relatively smooth and even. However, the "patchiness" of the image in FIG. 2B is due to the fact that the image in FIG. 2B is divided into polygonal regions (e.g. quadrilaterals) having substantially homogenous features so as to improve local detail by adjusting the dynamic range in each of the regions using statistical information computed for only those pixels that fall within those regions.

Figure 2C:
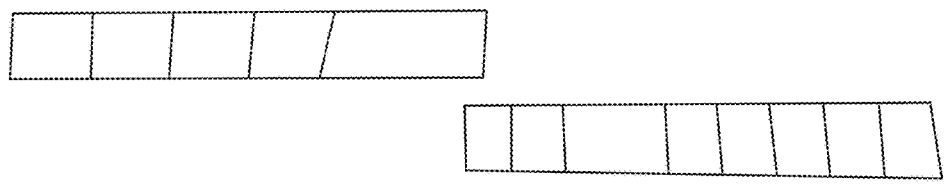
FIG. 2C depicts a polygonal layout (e.g., quadrilateral layout) used to sub-divide the image in FIG. 2B into a plurality of regions or sections; according to an embodiment of the present invention.

FIG. 2C depicts the polygonal layout (e.g., quadrilateral layout) used to divide the image in FIG. 2B into a plurality of regions or sections, according to an embodiment of the present invention. A plurality of LUTs are computed using histograms determined for each of the plurality of regions. As a result, the regions that define the "patchy" image display detail that is better than if a single LUT was derived from the histogram of the entire image, as is the case for the image shown in FIG. 2A.

Figure 3A:
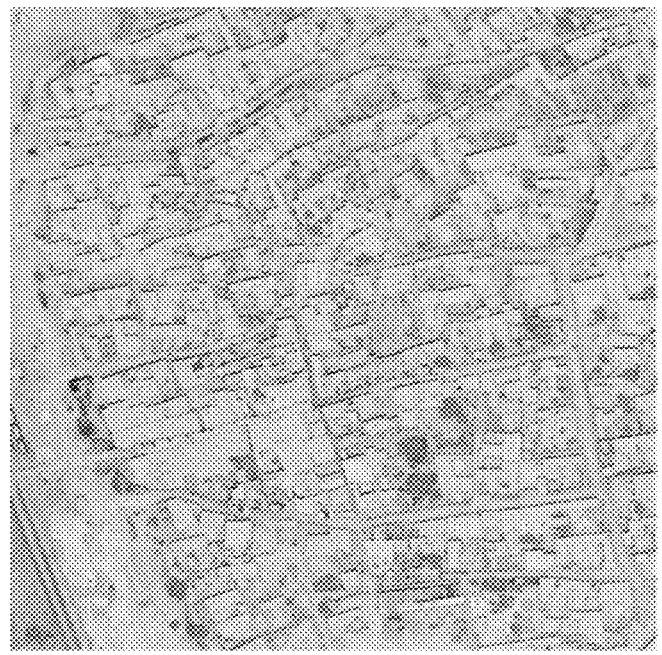
FIG. 3A depicts an image portion obtained when zooming into the top-left corner region of the image shown in FIG. 2A.
Figure 3B:
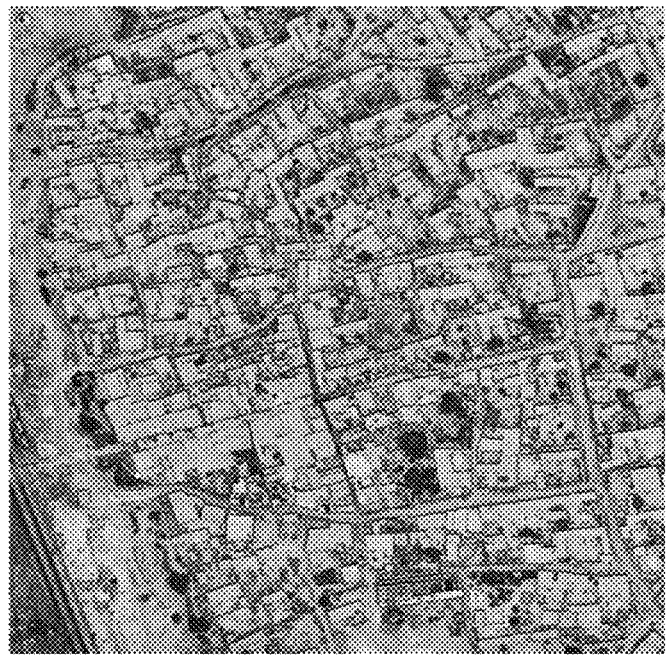
FIG. 3B depicts an image portion obtained when zooming into the top-left corner region of the image shown in FIG. 2B.

FIG. 3A depicts an image portion obtained when zooming into the top-left corner region of the image shown in FIG. 2A. FIG. 3B depicts an image portion obtained when zooming into the top-left corner region of the image shown in FIG. 2B. The image portion shown in FIG. 3A lacks contrast and detail of the features in this image portion can not be discerned. On the other hand, the image portion shown in FIG. 3B and covering the same area covered by the image shown in FIG. 3A, is crisp and details of features in this image portion can be discerned.

Hence, the method of computing a histogram for each region in a plurality of regions allow for accommodating a greater dynamic range of color when converting pixel data from higher bit depths per band to lower bit depths per band (e.g., 8 bits per band) for display on a standard 24-bit RGB displays. By pre-computing and storing feature-based statistics or statistical data and histograms within images with the higher bit depths per band, conversion of an area or region of interest from a higher bit depth per band into lower bit depth per band can be directly performed (i.e., performed "on-the-fly"). This would eliminate the need to generate additional for-display-only 8 bits per band image conversion. By eliminating the need to generate additional for-display-only 8 bits per band image conversion, the use of storage disk space can be reduced or minimized.

In some embodiments, programs for performing methods in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) can be designed to implement the method or methods of the present invention.

Although the various steps of the method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method for storing data related to an image, the image being associated with statistical data, the method being implemented by a computer system that includes one or more processors configured to execute computer program instructions, the method comprising:
   unevenly dividing the image into a plurality of polygonal image sections based on a detection of substantially homogenous features delimiting each of the polygonal image sections, each polygonal image section having the substantially homogenous features and comprising a plurality of pixels, each pixel having one or more bands and a bit depth per band that is too high for displaying on a display screen, the statistical data comprising statistical data computed for each band of each pixel within each polygonal image section, the image being further divided into a plurality of quads such that each quad has boundaries that contains at least a portion of one of the plurality of polygonal image sections;
   organizing the image, the plurality of quads, and the plurality of polygonal image sections in a form of a hierarchical tree structure such that a root node corresponding to the image has a plurality of branches corresponding to the plurality of quads and a branch node of the tree structure corresponding to a quad of the plurality of quads has two or more leaf nodes, each leaf node corresponding to a polygonal image section of the plurality of polygonal image sections; and
   storing the statistical data and the form of the hierarchical tree structure.

2. The method according to claim 1, wherein the uneven division into the plurality of polygonal image sections comprises at least two polygonal image sections of the plurality of polygonal image sections that have different polygonal shapes or area sizes or that have a different number of sides.

3. The method according to claim 1, further comprising:
   storing a plurality of reduced resolution datasets (R-Sets), each of the R-Sets being a progressively smaller version of the image,
   wherein data describing each of the polygonal image sections is stored with the statistical data for pixels within the each section.

4. The method according to claim 1, further comprising:
   determining in which quad of the plurality of quads and, for each quad, in which of the plurality of polygonal image sections each pixel is located by traversing the hierarchical tree structure from the root node corresponding to the image to the leaf nodes corresponding to the polygonal image sections,
   wherein the hierarchical tree is traversed sequentially.

5. The method according to claim 1, further comprising:
   determining in which quad of the plurality of quads and, for each quad, in which of the plurality of polygonal image sections each pixel is located by traversing the hierarchical tree structure from the root node corresponding to the image to the leaf nodes corresponding to the polygonal image sections,
   wherein the hierarchical tree is traversed using parallel processing.

6. The method according to claim 1, wherein the statistical data of each band of each pixel within each polygonal image section of the image comprises a histogram, and
   wherein if a pixel is within multiple, overlapping polygonal image sections then the histogram of the polygonal image section computed most recently is used in computing the statistical data.

7. The method according to claim 1, further comprising:
   storing coordinates of each of the plurality of polygonal image sections and coordinates of at least one polygonal image section that intersects with a quad in a reduced resolution dataset (R-Set), the R-Set being reduced with respect to the image.

8. The method according to claim 1, further comprising:
   converting each pixel having the bit depth per band that is too high for displaying on the display screen in an area of interest of the image into a corresponding pixel that has a lower bit depth per band that is displayable on the display screen using the statistical data of each polygonal image section in which the respective pixel is located to obtain an image that corresponds to the area of interest and that has pixels with the lower bit depth per band.

9. The method according to claim 1, wherein the statistical data for pixels within each polygonal image section is used to generate a plurality of look up tables, each look up table in the plurality of look up tables being associated with the corresponding polygonal image section of the plurality of polygonal image sections.

10. The method according to claim 1, wherein the statistical data for pixels within each polygonal section are computed using one or more of minimum/maximum values, standard deviation, mean, median, mode, skew, and kurtosis for each band of each pixel in the image.

11. A computer system for storing data related to an image, the image being associated with statistical data, the computer system comprising one or more processors configured to:
    unevenly divide the image into a plurality of polygonal image sections based on a detection of substantially homogenous features delimiting each of the polygonal image sections, each polygonal image section having the substantially homogenous features and comprising a plurality of pixels, each pixel having one or more bands and a bit depth per band that is too high for displaying on a display screen, the statistical data comprising statistical data computed for each band of each pixel within each polygonal image section, the image being further divided into a plurality of quads such that each quad has boundaries that contains at least a portion of one of the plurality of polygonal image sections;
    organize the image, the plurality of quads, and the plurality of polygonal image sections in a form of a hierarchical tree structure such that a root node corresponding to the image has a plurality of branches corresponding to the plurality of quads and a branch node of the tree structure corresponding to a quad of the plurality of quads has two or more leaf nodes, each leaf node corresponding to a polygonal image section of the plurality of polygonal image sections; and
    store the statistical data and the form of the hierarchical tree structure.

12. The computer system according to claim 11, wherein the uneven division into the plurality of polygonal image sections comprises at least two polygonal image sections of the plurality of polygonal image sections that have different polygonal shapes or area sizes or that have a different number of sides.

13. The computer system according to claim 11, wherein the one or more processors are further configured to store a plurality of reduced resolution datasets (R-Sets), each of the R-Sets being a progressively smaller version of the image, and wherein data describing each of the polygonal image sections is stored with the statistical data for pixels within the each section.

14. The computer system according to claim 11, wherein the one or more processors are further configured to:

determine in which quad of the plurality of quads and, for each quad, in which of the plurality of polygonal image sections each pixel is located by traversing the hierarchical tree structure from the root node corresponding to the image to the leaf nodes corresponding to the polygonal image sections, wherein the hierarchical tree is traversed sequentially.

15. The computer system according to claim 11, wherein the one or more processors are further configured to:

determine in which quad of the plurality of quads and, for each quad, in which of the plurality of polygonal image sections each pixel is located by traversing the hierarchical tree structure from the root node corresponding to the image to the leaf nodes corresponding to the polygonal image sections, wherein the hierarchical tree is traversed using parallel processing.

16. The computer system according to claim 11, wherein the statistical data of each band of each pixel within each polygonal image section of the image comprises a histogram, wherein if a pixel is within multiple, overlapping polygonal image sections then the histogram of the polygonal image section computed most recently is used in computing the statistical data.

17. The computer system according to claim 11, wherein the one or more processors are further configured to:

store coordinates of each of the plurality of polygonal image sections and coordinates of at least one polygonal image section that intersects with a quad in a reduced resolution dataset (R-Set), the R-Set being reduced with respect to the image.

18. The computer system according to claim 11, wherein the one or more processors are further configured to convert each pixel having the bit depth per band that is too high for displaying on the display screen in an area of interest of the image into a corresponding pixel that has a lower bit depth per band that is displayable on the display screen using the statistical data of each polygonal image section in which the respective pixel is located to obtain an image that corresponds to the area of interest and that has pixels with the lower bit depth per band.

19. The computer system according to claim 11, wherein the statistical data for pixels within each polygonal image section is used to generate a plurality of look up tables, each look up table in the plurality of look up tables being associated with the corresponding polygonal image section of the plurality of polygonal image sections.

20. The computer system according to claim 11, wherein the statistical data for pixels within each polygonal section are computed using one or more of minimum/maximum values, standard deviation, mean, median, mode, skew, and kurtosis for each band of each pixel in the image.

21. The method according to claim 1, wherein the substantially homogenous features of a first one of the polygonal image sections are different from the substantially homogenous features of a second one of the polygonal image sections.

* * * * *